United States Patent
Snape et al.

(10) Patent No.: US 10,371,055 B2
(45) Date of Patent: Aug. 6, 2019

(54) INTERCOOLED COOLING AIR USING COOLING COMPRESSOR AS STARTER

(71) Applicant: United Technologies Corporation, Hartford, CT (US)

(72) Inventors: Nathan Snape, Tolland, CT (US); Gabriel L. Suciu, Glastonbury, CT (US); Brian D. Merry, Andover, CT (US)

(73) Assignee: United Technologies Corporation, Farmington, CT (US)

(*) Notice: Subject to any disclaimer, the term of this patent is extended or adjusted under 35 U.S.C. 154(b) by 852 days.

(21) Appl. No.: 14/837,009

(22) Filed: Aug. 27, 2015

(65) Prior Publication Data

US 2016/0237909 A1 Aug. 18, 2016

Related U.S. Application Data

(60) Provisional application No. 62/115,578, filed on Feb. 12, 2015.

(51) Int. Cl.
*F02C 7/18* (2006.01)
*F02K 3/075* (2006.01)
(Continued)

(52) U.S. Cl.
CPC ............... *F02C 7/185* (2013.01); *F02C 3/04* (2013.01); *F02C 6/08* (2013.01); *F02C 7/277* (2013.01);
(Continued)

(58) Field of Classification Search
CPC ........ F02C 6/08; F02C 9/18; F05D 2260/211; F05D 2260/85; F02K 3/025; F02K 3/065; F02K 3/075
See application file for complete search history.

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

European Search Report for European Application No. 16155316.9 completed Jun. 30, 2016.
(Continued)

*Primary Examiner* — Gerald L Sung
*Assistant Examiner* — Alain Chau
(74) *Attorney, Agent, or Firm* — Carlson, Gaskey & Olds, P.C.

(57) ABSTRACT

A gas turbine engine comprises a main compressor section having a high pressure compressor with a downstream discharge, and more upstream locations. A turbine section has a high pressure turbine. A tap taps air from at least one of the more upstream locations in the compressor section, passes the tapped air through a heat exchanger and then to a cooling compressor. The cooling compressor compresses air downstream of the heat exchanger, and delivers air into the high pressure turbine. The cooling compressor is connected to be driven with at least one rotor in the main compressor section. A source of pressurized air is selectively sent to the cooling compressor to drive a rotor of the cooling compressor to rotate, and to in turn drive the at least one rotor of the main compressor section at start-up of the gas turbine engine. An intercooling system is also disclosed.

13 Claims, 6 Drawing Sheets

(51) Int. Cl.
  *F02C 7/277*   (2006.01)
  *F02C 6/08*    (2006.01)
  *F02C 7/32*    (2006.01)
  *F02C 3/04*    (2006.01)
  *F02K 3/02*    (2006.01)
  *F02K 3/065*   (2006.01)

(52) U.S. Cl.
  CPC ............... *F02C 7/32* (2013.01); *F02K 3/025* (2013.01); *F02K 3/065* (2013.01); *F02K 3/075* (2013.01); *F05D 2260/213* (2013.01); *Y02T 50/671* (2013.01); *Y02T 50/676* (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 5,056,335 A | 10/1991 | Renninger et al. | |
| 5,163,285 A * | 11/1992 | Mazeaud | F01D 5/08 60/806 |
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 | 11/2010 | Seitzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0275769 A1 * | 10/2015 | Foutch | F02C 9/18 60/776 |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2016/0369705 A1 * | 12/2016 | Mackin | F02C 6/08 |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |

(56) References Cited

FOREIGN PATENT DOCUMENTS

| | | |
|---|---|---|
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for EP Application No. 17160816.9 dated Jul. 21, 2017.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.

* cited by examiner

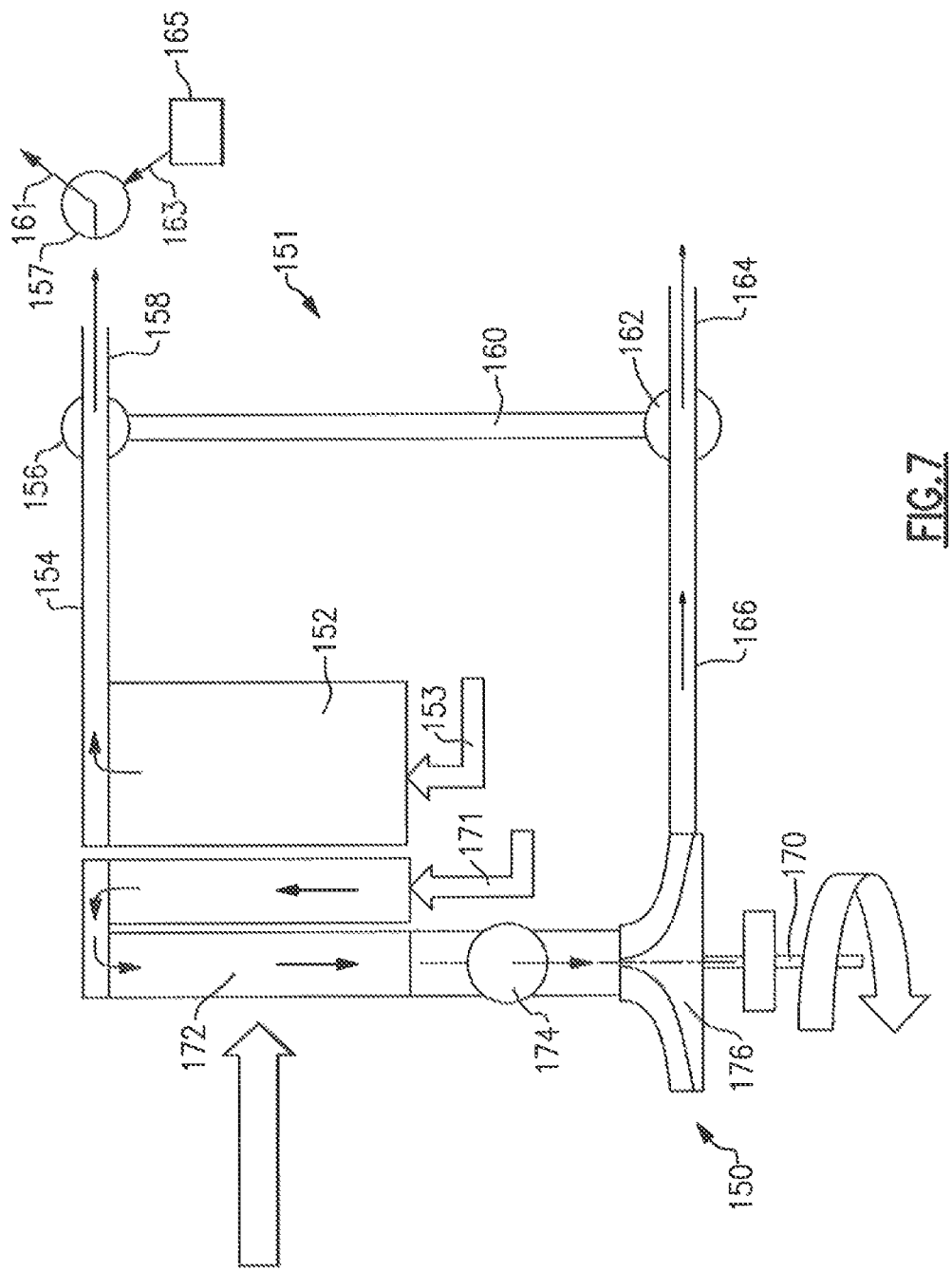

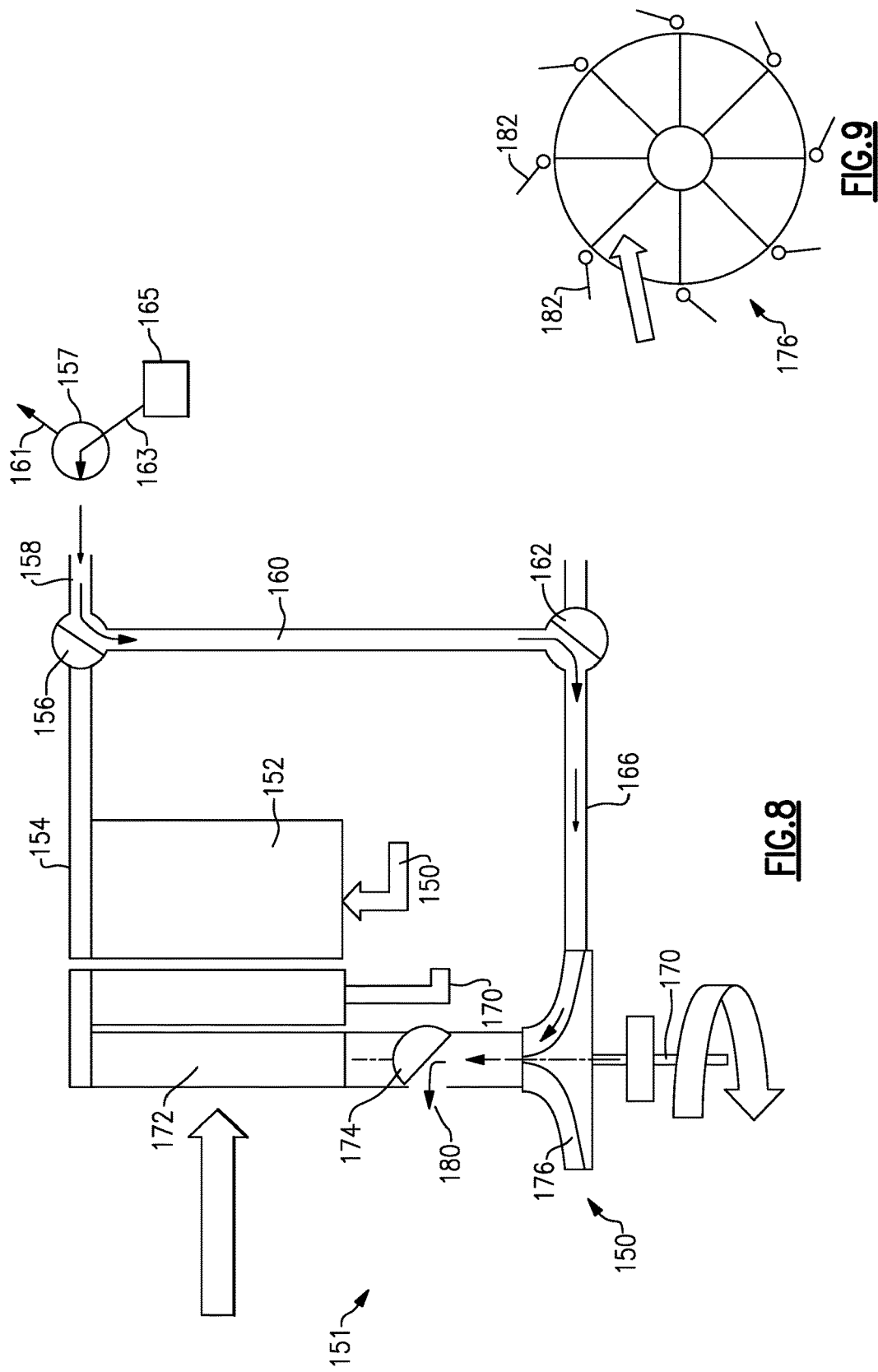

INTERCOOLED COOLING AIR USING COOLING COMPRESSOR AS STARTER

CROSS-REFERENCE TO RELATED APPLICATION

This application claims priority to U.S. Provisional Patent Application No. 62/115,578, filed 12 Feb. 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

Existing gas turbine engines are provided with an air turbine starter to begin rotation of the components at start-up.

SUMMARY

In a featured embodiment, a gas turbine engine comprises a main compressor section having a high pressure compressor with a downstream discharge, and more upstream locations. A turbine section has a high pressure turbine. A tap taps air from at least one of the more upstream locations in the compressor section, passes the tapped air through a heat exchanger and then to a cooling compressor. The cooling compressor compresses air downstream of the heat exchanger, and delivers air into the high pressure turbine. The cooling compressor is connected to be driven with at least one rotor in the main compressor section. A source of pressurized air is selectively sent to the cooling compressor to drive a rotor of the cooling compressor to rotate, and to in turn drive the at least one rotor of the main compressor section at start-up of the gas turbine engine.

In another embodiment according to the previous embodiment, the rotor of the cooling compressor includes a centrifugal compressor impeller.

In another embodiment according to any of the previous embodiments, air temperatures at the downstream discharge of the high pressure compressor are greater than or equal to 1350° F.

In another embodiment according to any of the previous embodiments, the turbine section drives a bull gear, which further drives ng the impeller of the cooling compressor.

In another embodiment according to any of the previous embodiments, the source of pressurized air is an auxiliary power unit.

In another embodiment according to any of the previous embodiments, a cooling compressor valve is movable between two positions, with a first position delivering air from the cooling compressor to the high pressure turbine, and in a second position delivering air from the auxiliary power unit to the rotor of the cooling compressor.

In another embodiment according to any of the previous embodiments, a precooler receives air from the main compressor section, and cools the air to be delivered to an associated aircraft. A precooler valve is movable between two positions, with a first position allowing air from the precooler to move downstream to the aircraft, and in a second position, blocking flow from the precooler to the aircraft, and allowing flow from the auxiliary power unit to pass to the cooling compressor valve.

In another embodiment according to any of the previous embodiments, an APU valve is movable between two positions to selectively block or allow flow from the precooler valve to the aircraft, or to selectively allow airflow from the auxiliary power unit to pass to the precooler valve.

In another embodiment according to any of the previous embodiments, an impeller valve is positioned between the heat exchanger and the rotor of the cooling compressor, and the cooling compressor valve being selectively movable between two positions, with a first position allowing air from the heat exchanger to pass to the rotor of the cooling compressor, and a second position allowing air having driven the rotor of the cooling compressor to be dumped to atmosphere.

In another embodiment according to any of the previous embodiments, the impeller is provided with variable vanes to direct air to the impeller in a desired direction when the rotor of the cooling compressor is being driven to rotate by the pressurized air.

In another embodiment according to any of the previous embodiments, a cooling compressor valve is movable between two positions, with a first position delivering air from the cooling compressor to the high pressure turbine, and in a second position delivering pressurized air from the source to the rotor of the cooling compressor.

In another embodiment according to any of the previous embodiments, a precooler receives air from the main compressor section, and cools the air to be delivered to an associated aircraft. A precooler valve is movable between two positions, with a first position allowing air from the precooler to move downstream to the aircraft, and in a second position, blocking flow from the precooler to the aircraft, and allowing pressurized air from the source to pass to the cooling compressor valve.

In another embodiment according to any of the previous embodiments, an APU valve is movable between two positions to selectively block or allow flow from the precooler valve to the aircraft, or to selectively allow airflow from the source to pass to the precooler valve.

In another embodiment according to any of the previous embodiments, an impeller valve is positioned between the heat exchanger and the rotor of the cooling compressor, and the cooling compressor valve being selectively movable between two positions, with a first position allowing air from the heat exchanger to pass to the rotor of the cooling compressor, and a second position allowing air having driven the rotor of the cooling compressor to be dumped to atmosphere.

In another featured embodiment, an intercooling system for a gas turbine engine comprises a heat exchanger for cooling air drawn from a portion of a main compressor section at a first temperature and pressure for cooling the air to a second temperature cooler than the first temperature. A cooling compressor compresses air communicated from the heat exchanger to a second pressure greater than the first pressure and communicates the compressed air to a portion of a turbine section. The cooling compressor is connected to be driven with a rotor in a main compressor section. A source of pressurized air is selectively sent to the cooling compressor to drive a rotor of the cooling compressor to rotate, to in turn drive the rotor of the main compressor section at start-up of an associated gas turbine engine.

In another embodiment according to the previous embodiment, a cooling compressor valve is movable between two positions, with a first position delivering air from the cooling compressor to the turbine section, and in a second position delivering pressurized air from the source to the rotor of the cooling compressor.

In another embodiment according to any of the previous embodiments, a precooler valve is movable between two positions, with a first position allowing air from a precooler to move downstream to an aircraft, and in a second position, blocking flow from the precooler to the aircraft, and allowing pressurized air from the source to pass to the cooling compressor valve.

In another embodiment according to any of the previous embodiments, a rotor valve is positioned between the heat exchanger and the rotor of the cooling compressor, and the cooling compressor valve being selectively movable between two positions, with a first position allowing air from the heat exchanger to pass to the rotor of the cooling compressor, and a second position allowing air having driven the rotor of the cooling compressor to be dumped to atmosphere.

In another embodiment according to any of the previous embodiments, the rotor of the cooling compressor includes a centrifugal compressor impeller.

In another embodiment according to any of the previous embodiments, the impeller is provided with variable vanes to direct air to the impeller in a desired direction when the rotor of the cooling compressor is being driven to rotate by the pressurized air.

These and other features may be best understood from the following drawings and specification.

BRIEF DESCRIPTION OF THE DRAWINGS

FIG. 7 shows a featured embodiment.
FIG. 8 shows the FIG. 7 embodiment in a second operational phase.
FIG. 9 shows an impeller having variable vanes.

DETAILED DESCRIPTION

Figure 1:
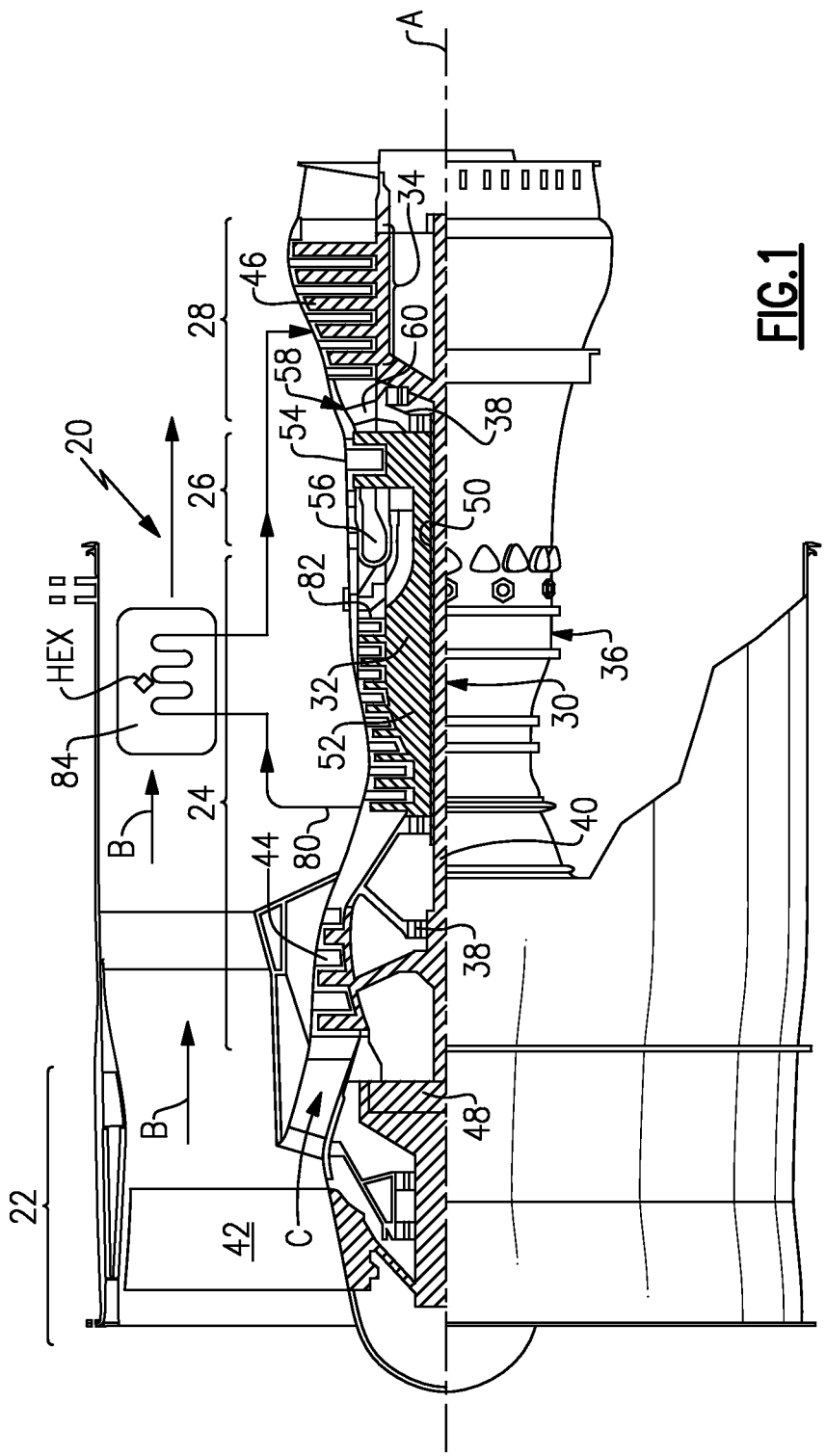
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the discharge 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
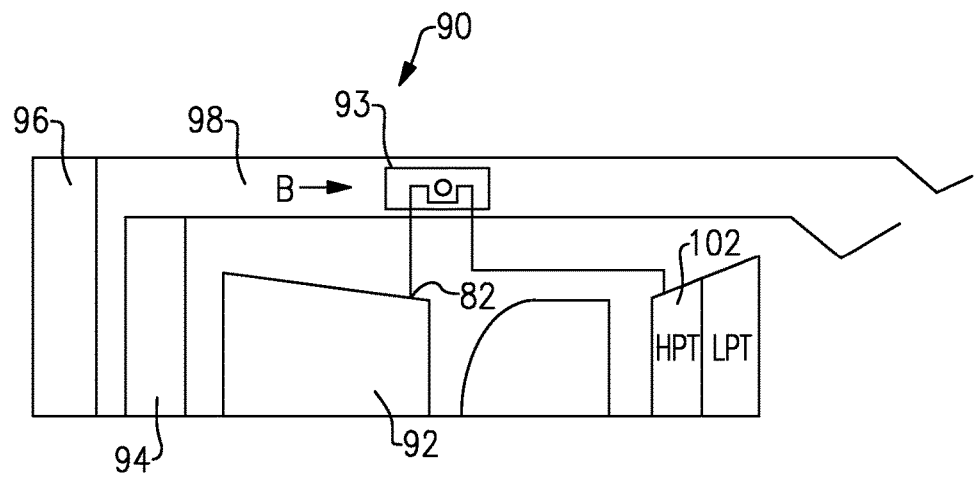
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point, or discharge 82 of the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 92 is known as station 3. The temperature T3 and pressure P3 at station 3 are both very high.

In future engines, T3 levels are expected to approach greater than or equal to 1350° F. Current heat exchanger technology is becoming a limiting factor as they are made of materials, manufacturing, and design capability which have difficulty receiving such high temperature and pressure levels.

Figure 3:
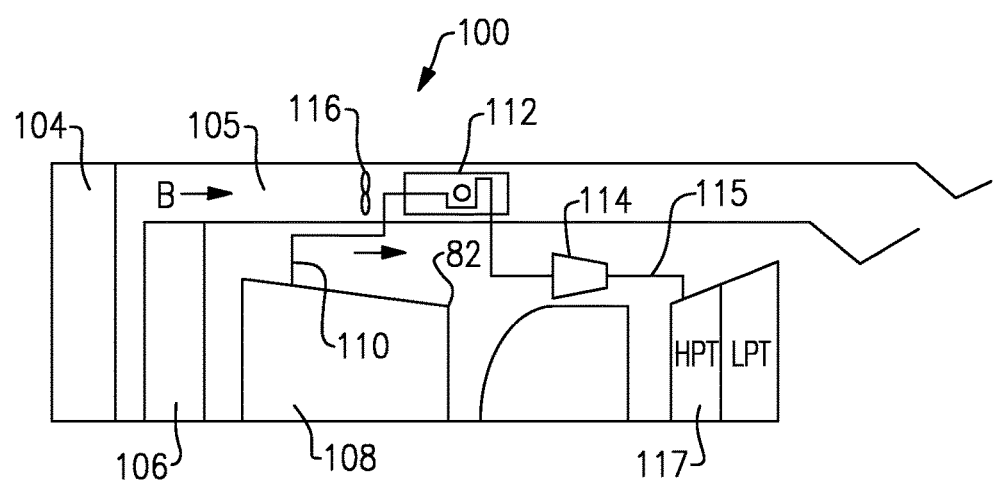
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 may be positioned upstream of the heat exchanger 112 as illustrated. The main fan 104 may not provide sufficient pressure to drive sufficient air across the heat exchanger 112. The auxiliary fan will ensure there is adequate air flow in the circumferential location of the heat exchanger 112.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

Figure 4:
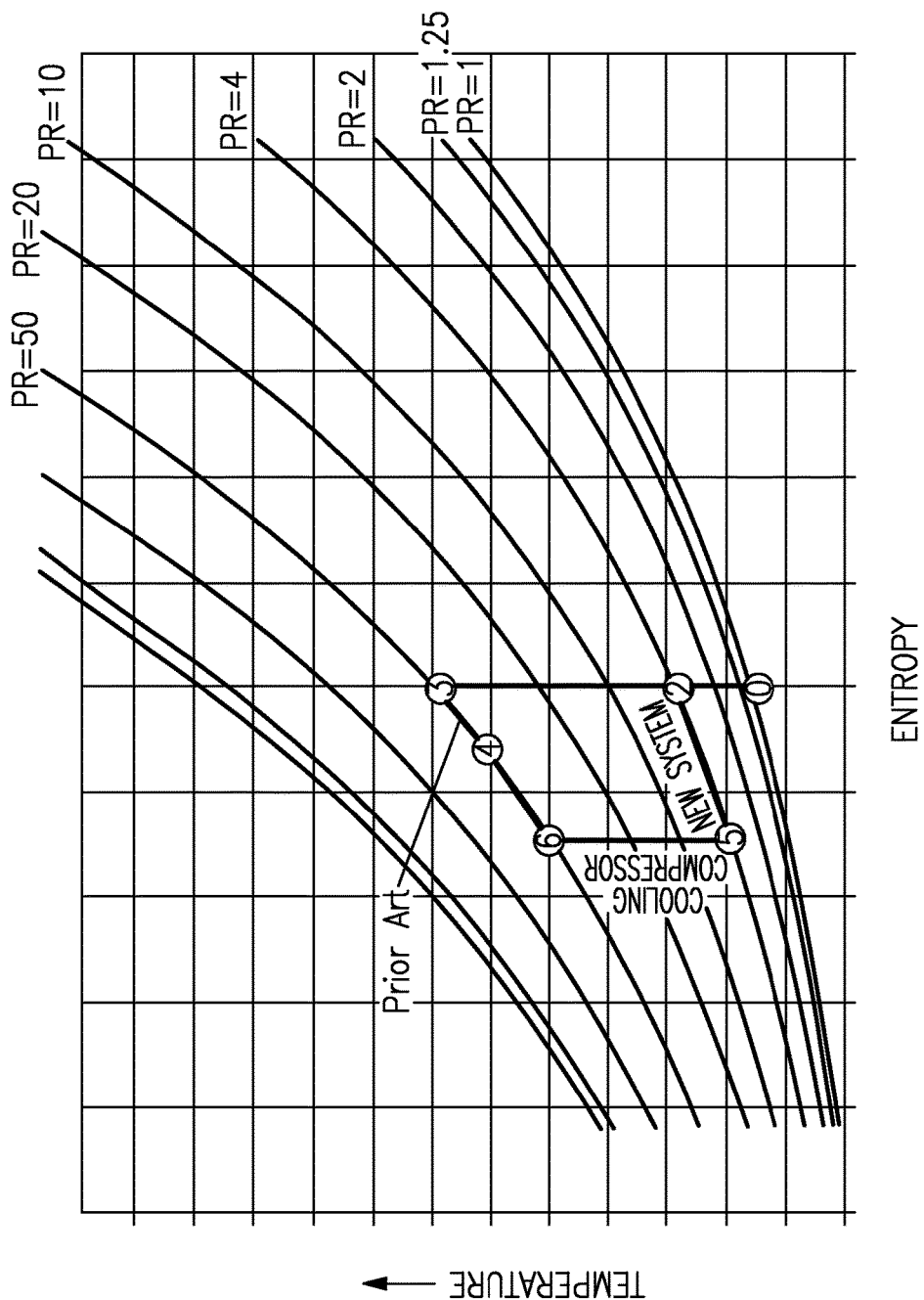
FIG. 4 is a graph illustrating increasing temperatures of a tapped air against the work required.

Referring to FIG. 4, a temperature/entropy diagram illustrates that a lower level of energy is spent to compress air of a lower temperature to the desired P3 pressure level. Cooler air requires less work to compress when compared to warmer air. Accordingly, the work required to raise the pressure of the air drawn from an early stage of the compressor section is less than if the air were compressed to the desired pressure within the compressor section. Therefore, high pressure air at P3 levels or higher can be obtained at significantly lower temperatures than T3. As shown in FIG. 4, to reach a particular pressure ratio, 50 for example, the prior system would move from point 2 to point 3, with a dramatic increase in temperature. However, the disclosed or new system moves from point 2 to point 5 through the heat exchanger, and the cooling compressor then compresses the air up to point 6. As can be appreciated, point 6 is at a much lower temperature.

Figure 5:
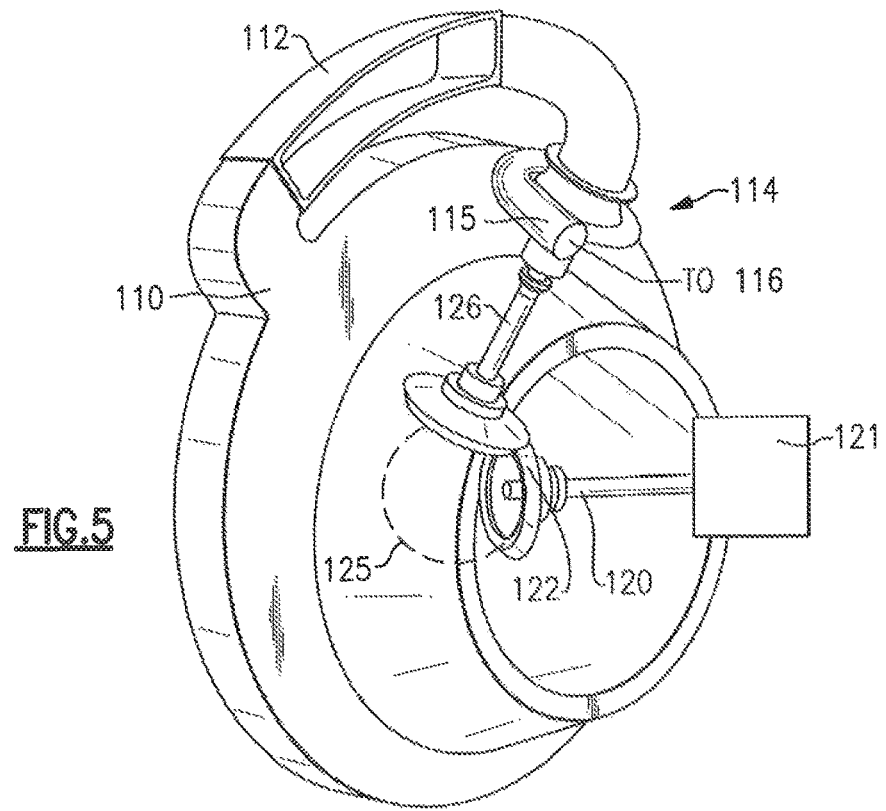
FIG. 5 shows a detail of the example engine of FIG. 3.

FIG. 5 shows a detail of compressor 114 having an outlet into conduit 115. A primary tower shaft 120 drives an accessory gearbox 121. The shaft 126 drives a compressor rotor within the compressor 114. The shafts 120 and 126 may be driven by a bull gear 125 driven by a turbine rotor, and in one example, with a high pressure compressor rotor.

Figure 6:
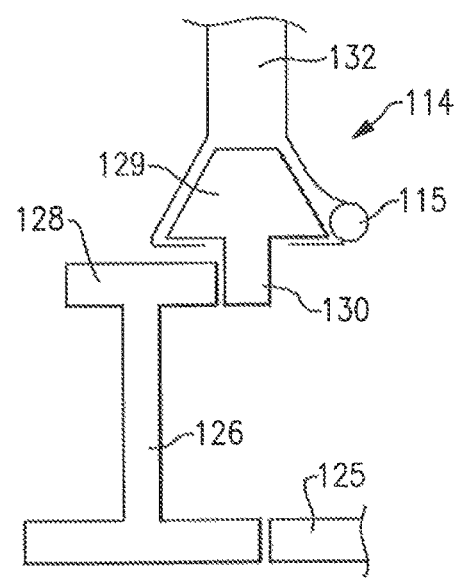
FIG. 6 shows a further detail of the example engine of FIG. 5.

FIG. 6 shows an example wherein a gear 128 is driven by the shaft 126 to, in turn, drive a gear 130 which drives a centrifugal compressor impeller 129. An input 132 to the compressor impeller 129 supplies the air from the tap 110. The air is compressed and delivered into the outlet conduit 115.

By providing a gear ratio multiplier between the compressor impeller 129 and the high spool bull gear 125, the compressor impeller may be driven to operate an optimum speed. As an example, the gear ratio increase may be in a range of 5:1-8:1, and in one embodiment, 6:1.

Details of the engine, as set forth above, may be found in co-pending U.S. patent application Ser. No. 14/695,578, which is incorporated herein by reference in its entirety.

FIG. 7 shows a system 151 which allows the elimination of the prior art air turbine starter. As known, an air turbine starter is typically included with a gas turbine engine and receives pressurized air from an auxiliary power unit when it is desired to start a gas turbine engine. The air turbine starter is connected to drive the compressor section of the gas turbine engine. When the air turbine starter receives the pressurized air, its turbine is driven to rotate, to in turn start rotation of the compressor section in the gas turbine engine.

System 151 utilizes the cooling compressor 150 to eliminate the need for a separate air turbine starter. As shown in FIG. 7, a pre-cooler 152 may receive high pressure compressor air 153 to deliver into a conduit 154. Conduit 154 delivers air through a two-way valve 156 to a port 158 which may provide air to an associated aircraft, such as for use for the passenger cabin on the aircraft. The valve 156 is shown blocking flow to a conduit 160. Conduit 160 communicates with a valve 162. In the FIG. 7 position, valve 162 blocks flow from conduit 160. Valve 162 is shown in a position communicating air 166 downstream of the cooling compressor 150 to a line 164 heading to the high pressure turbine, as in the above embodiments. As in the prior embodiments, air 171 is delivered into a heat exchanger 172, through a valve 174, and to the cooling compressor 150. In this position, the shaft 170 is driven to rotate the cooling compressor 150 as disclosed above. The valves 156, 162, and 174 may all be connected with a controller for the system. The controller could be the overall controller for the gas turbine engine, or could be some other type of controller which is adequate to change the position of the valves between the position shown in FIG. 7 and a position shown in FIG. 8. The valves may have any structure, such that they can move between the two positions.

As shown in FIG. 7, downstream of the port 158, the air encounters a two-way valve 157. The air through valve 157 is delivered to a line 161, which will actually provide the air to the aircraft use, such as for use in the passenger cabin. As shown, a connection 163 to the valve 157 is blocked in this position. Line 163 communicates with an APU 165. In the FIG. 8 position, as will be better described below, the valves 156 and 157 have changed positions. Air is no longer delivered from the precooler 152 downstream of the valve 156. Rather, air from the APU 165 passes through the valve 157, into port 158, through the valve 156, and into the conduit 160.

As shown in FIG. 8, at start-up, the valves 156 and 157 are moved and connect pressurized air from an auxiliary power unit 165 into conduit 160, and to the valve 162. Shaft 170 would not be driven to rotate until the engine starts, so impeller 176 is not rotating.

Valve 162 is now rotated to deliver that air into the conduit 166, and to drive the impeller 176 of the cooling compressor 150 to rotate, and operate as a turbine. Thus, the shaft 170 is now driven by impeller 176 to rotate. As explained above, the shaft 170 is fixed to rotate with the compressor. In the FIG. 8 position, the impeller 176 and the rotation of the shaft 170 will start rotation of the compressor for the gas turbine engine. The valve 174 is also moved to a position such that the air downstream of the impeller 176 is dumped to atmosphere at 180.

For purposes of this application, valve 157 may be called an APU valve, valve 156 a precooler valve, valve 162 a cooling compressor valve, and valve 174 an impeller or rotor valve.

Of course, ways of communicating pressurized air to the impeller 176, other than the valving structure selectively blocking/allowing flow from the precooler 152 would come within the scope of this disclosure.

FIG. 9 schematically shows the impeller 176 having variable vanes 182. The variable vanes 182 are positioned outwardly of the impeller 176. The controller will also control the position of the variable vanes 182 to control the direction of the air approaching the impeller in the start position of FIG. 8, or in the normal compressing position of FIG. 7. Variable vanes are known, and the control of the vanes would be well within the skill of a worker in this art.

With the above arrangement, the cooling compressor allows elimination of the air turbine starter. This provides valuable benefits in reduction of weight, elimination of associated systems for the air turbine starter, and provides better packaging by eliminating the air turbine starter.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
a main compressor section having a high pressure compressor with a downstream discharge, and more upstream locations; a turbine section having a high pressure turbine;
a tap tapping air from at least one of the more upstream locations in the compressor section, passing the tapped air through a heat exchanger and then to a cooling compressor, the cooling compressor compressing air downstream of the heat exchanger, and delivering air into the high pressure turbine;
the cooling compressor being connected to be driven with at least one rotor in the main compressor section, and a source of pressurized air that is selectively sent to the cooling compressor, to drive a rotor of the cooling compressor to rotate, to in turn drive the at least one rotor of the main compressor section at start-up of the gas turbine engine;
the source of pressurized air is an auxiliary power unit;
a cooling compressor valve that is movable between two positions, with a first position delivering air from the cooling compressor to the high pressure turbine, and in a second position delivering the pressurized air from the auxiliary power unit to the rotor of the cooling compressor; and a precooler that receives air from the main compressor section, and cools the air to be delivered to an associated aircraft, and a precooler valve that is movable between two positions, with a first position allowing air from the precooler to move through said precooler valve and downstream to the aircraft, and in a second position, blocking flow of the air from the precooler to the aircraft, and allowing the pressurized air from the auxiliary power unit to pass through said precooler valve and to the cooling compressor valve.

2. The gas turbine engine as set forth in claim 1, wherein the rotor of the cooling compressor includes a centrifugal compressor impeller.

3. The gas turbine engine as set forth in claim 2, wherein air temperatures at the downstream discharge of the high pressure compressor are greater than or equal to 1350° F.

4. The gas turbine engine as set forth in claim 3, wherein the turbine section drives a bull gear, the bull gear further driving the impeller of the cooling compressor.

5. The gas turbine engine as set forth in claim 1, wherein an APU valve is movable between two positions to selectively block or allow flow of the air from the precooler valve to the aircraft, when the precooler valve is in said first position or to selectively allow the pressurized air from the auxiliary power unit to pass to the precooler valve, when the precooler valve is in said second position.

6. The gas turbine engine as set forth in claim 5, wherein an impeller valve is positioned between the heat exchanger and the rotor of the cooling compressor, and the impeller valve being selectively movable between two positions, with a first position allowing air from the heat exchanger to pass to the rotor of the cooling compressor, and a second position allowing the pressurized air having driven the rotor of the cooling compressor to be dumped to atmosphere, and air passing through said impeller valve from the heat exchanger to the cooling compressor when the impeller valve is in said first position, and the pressurized air having driven the rotor of the cooling compressor passing through said impeller valve in said second position to be dumped to atmosphere.

7. The gas turbine engine as set forth in claim 2, wherein the impeller is provided with variable vanes to direct air to the impeller in a desired direction when the rotor of the cooling compressor is being driven to rotate by the pressurized air.

8. The gas turbine engine as set forth in claim 1, wherein an APU valve is movable between two positions to selectively block or allow flow of the air from the precooler valve to the aircraft, when the precooler valve is in said first position or to selectively allow the pressurized air from the source to pass to the precooler valve, when the precooler valve is in said second position.

9. The gas turbine engine as set forth in claim 1, wherein an impeller valve is positioned between the heat exchanger and the rotor of the cooling compressor, and the impeller valve being selectively movable between two positions, with a first position allowing air from the heat exchanger to pass to the rotor of the cooling compressor, and a second position allowing the pressurized air having driven the rotor of the cooling compressor to be dumped to atmosphere, and air passing through said impeller valve from the heat exchanger to the cooling compressor when the impeller valve is in said first position, and the pressurized air having driven the rotor of the cooling compressor passing through said impeller valve in said second position to be dumped to atmosphere.

10. An intercooling system for a gas turbine engine comprising:

a heat exchanger for cooling air drawn from a portion of a main compressor section at a first temperature and pressure for cooling the air to a second temperature cooler than the first temperature;

a cooling compressor compressing air communicated from the heat exchanger to a second pressure greater than the first pressure and communicating the compressed air to a portion of a turbine section;

the cooling compressor being connected to be driven by a rotor of the main compressor section, and a source of pressurized air that is selectively sent to the cooling compressor, to drive a rotor of the cooling compressor to rotate, to in turn drive the rotor of the main compressor section at start-up of an associated gas turbine engine;

a cooling compressor valve that is movable between two positions, with a first position delivering air from the cooling compressor to the turbine section, and in a second position delivering pressurized air from the source to the rotor of the cooling compressor; and a precooler valve that is movable between two positions, with a first position allowing air from a precooler to move through said precooler valve and downstream to an aircraft, and in a second position, blocking flow of the air from the precooler to the aircraft, and allowing pressurized air from the source to pass through said precooler valve and to the cooling compressor valve.

11. The intercooling system as set forth in claim 10, wherein the rotor of the cooling compressor includes a centrifugal compressor impeller.

12. The intercooling system as set forth in claim 11, wherein the impeller is provided with variable vanes to direct air to the impeller in a desired direction when the rotor of the cooling compressor is being driven to rotate by the pressurized air.

13. The intercooling system for as set forth in claim 10, wherein an impeller valve is positioned between the heat exchanger and the rotor of the cooling compressor, and the impeller valve being selectively movable between two positions, with a first position allowing air from the heat exchanger to pass to the rotor of the cooling compressor, and a second position allowing the pressurized air having driven the rotor of the cooling compressor to be dumped to atmosphere, and air passing through said impeller valve from the heat exchanger to the cooling compressor when the impeller valve is in said first position, and the pressurized air having driven the rotor of the cooling compressor passing through said impeller valve in said second position to be dumped to atmosphere.

* * * * *